(12) United States Patent
Bulfin

(10) Patent No.: US 8,296,772 B2
(45) Date of Patent: Oct. 23, 2012

(54) CUSTOMER INFORMATION CONTROL SYSTEM WORKLOAD MANAGEMENT BASED UPON TARGET PROCESSORS REQUESTING WORK FROM ROUTERS

(75) Inventor: William Joseph Bulfin, Hillsborough, NC (US)

(73) Assignee: International Business Machines Corporation, Armonk, NY (US)

( * ) Notice: Subject to any disclaimer, the term of this patent is extended or adjusted under 35 U.S.C. 154(b) by 1128 days.

(21) Appl. No.: 11/772,815

(22) Filed: Jul. 2, 2007

(65) Prior Publication Data

US 2009/0013327 A1     Jan. 8, 2009

(51) Int. Cl.
*G06F 9/46* (2006.01)
(52) U.S. Cl. ........................................ 718/105; 718/102
(58) Field of Classification Search .................. None
See application file for complete search history.

(56) References Cited

U.S. PATENT DOCUMENTS

| 5,475,813 A | 12/1995 | Cieslak et al. |
| 5,504,894 A | 4/1996 | Ferguson et al. |
| 2002/0194251 A1* | 12/2002 | Richter et al. ............... 709/105 |

OTHER PUBLICATIONS

CICSPlex SM Managing Workloads Version 2 Release 2 Seventh Edition pp. 1-164 Sep. 2005.*
The importance of systems management for a Parallel Sysplex P. Johnson IBM Systems Journal, vol. 36, No. 2 Published: 1997.*
Definitions of terms from techTarget.com Definitions: CICS, MVS, OLTP, sysplex, transaction, VTAM Published: None later than Dec. 2000.*
CICS—Family homepage Retrieved from: http://www-01.ibm.com/software/htp/cics/ Retrieved on: Nov. 30, 2011.*
CICS—An Introduction—Customer Information Control System— 35 years of reliable transactions Published: Jul. 8, 2004.*

* cited by examiner

*Primary Examiner* — Emerson Puente
*Assistant Examiner* — Paul Mills
(74) *Attorney, Agent, or Firm* — Lee Law, PLLC; Christopher B. Lee

(57) ABSTRACT

The invention provides for customer information control system (CICS) workload management in performance of computer processing tasks based upon "target" processors requesting work from "routers", by providing for a target process(or) to first initiate a request to a router seeking distribution of processing task(s) before a new task is assigned by the router to that target for completion.

14 Claims, 4 Drawing Sheets

CUSTOMER INFORMATION CONTROL SYSTEM WORKLOAD MANAGEMENT BASED UPON TARGET PROCESSORS REQUESTING WORK FROM ROUTERS

TECHNICAL FIELD

The invention relates to use of a customer information control system (CICS) in performing computer processing tasks.

BACKGROUND

A Customer Information Control System (CICS) is often used to manage large-scale computer processing transactions for "enterprise" user organizations such as banks, brokerage firms, insurance companies, large retailers, etc. To ensure the continuous availability of such systems in meeting business processing needs as well as to meet Service-Level Agreement (SLA) targets, such users have embraced the "parallel sysplex" data sharing model and the GDPS ("geographically dispersed parallel sysplex") for designing a computer operating system (such as the IBM z/OS®) to implement a CICS solution, which uses "multiple virtual storage" (MVS) operating systems divided into "logical partitions" (LPARs) that communicate for simultaneously storing and/or processing the data and program instructions needed to carry out CICS functions in managing workload distribution for an environment involving multitasked parallel computer processing resources.

With the advent of internet/web-based transaction processing, more enterprise users are moving towards implementation of a "service oriented architecture" (SOA) that utilizes a CICS system as the "back-end office" database server for the enterprise. As a result, the increasing number and volume of processing requests from web-based service requestors/messaging systems has resulted in a significant increase in CICS server transactions, causing system performance degradation due to "workload surging" during distribution (or "routing") of high volume processing task(s) requiring sub-second response times.

Existing CICSplex system workload management (WLM) algorithms (such as those disclosed in U.S. Pat. Nos. 5,504,894 and 5,475,813 which are incorporated by reference as if fully set forth herein) require "target" hardware/software resources (delineated into LPAR "regions" used in carrying out assigned processing tasks) to update current workload completion status/processing capacity (or "health") every fifteen (15) seconds to a local system address space manager (CMAS). However, the delay involved in transmission of this processing health information to "routing" hardware/software resources (also delineated into LPAR regions for distributing assigned processing tasks to target regions) results in inaccurate views of the "point-in-time" (i.e., "real-time") processing capacity of available targets when multiple LPARs or MVS address spaces are operating as cloned "images" of each other in managing a CICS workload (where the images may reside in the same "sysplex" or in multiple "sysplexes").

In a very high volume workload environment often involving the routing of over three-thousand (i.e., 3000+) processing transactions per second, the routers cannot maintain an accurate "real-time" accounting of the health of all target processing regions utilized for all LPARs, which results in an observed "surging" of transactions to a specific target region every fifteen seconds. This "surging effect" results in degraded processing performance as a target becomes saturated with work requests (and as a result may experience a "maxtask" and/or "stall" condition due to loss of storage space) until it can report its current (updated) processing health at the next fifteen second interval.

Other solutions to this problem have been suggested (such as shortening the fifteen second "heartbeat" interval for reporting target health) but this would increase central processing unit (CPU) usage time consumption in the target regions (and also result in increased use of virtual memory storage dataspace in distributing this information to other LPAR regions). The concept of using "coupling facility" structures in a "parallel sysplex" data sharing environment (to hold workload management health information) has also been explored, but that solution would only apply to a single "sysplex" environment and therefore would require redesign of many current CICSplex systems (while also introducing significant "coupling facility lock structure overhead" to a processing environment which is already prone to performance degradation).

SUMMARY OF THE INVENTION

The invention provides for customer information control system (CICS) workload management in performance of computer processing tasks based upon "target" processors requesting work from "routers". Specifically, the invention provides a system and method for a target process(or) to first initiate a request to a router seeking distribution of processing task(s) before a new task is assigned by the router to that target for completion, instead of reporting "target health" status to remote router(s) for distribution of processing tasks based upon outdated (or "stale") workload capacity information (since the target region can best assess its current true capacity to accept and process work requests).

If a target region can no longer accept work (due to its processing capacity threshold being exceeded) it communicates its current "not OK" (or unavailable) status in "real-time" to connected routing region(s) (established on any system LPAR) to inform each notified router to cease distribution of work to that target, and the same target subsequently communicates (in "real-time") its updated "OK" (or available) status to those routers when it is again capable of accepting work requests.

In so doing, the invention essentially reverses the methodology of current CICS workload management algorithm(s), where a router queries a target as to processing health (i.e., asking "Are you hungry?") and distributes work (or "feeds") the target based upon reported workload capacity, to instead require a target to request that processing task(s) be distributed by available router(s) (i.e., demanding "Feed Me!") in fulfilling work requests which must be satisfied.

It is therefore an object of the present invention to provide for customer information control system (CICS) workload management in performance of computer processing tasks based upon target processors requesting work from routers.

It is another object of the present invention to provide a method and system for the use of a target process(or) to first initiate a request to a router seeking distribution of processing task(s) before a new task is assigned by the router to that target for completion.

The subject matter which is regarded as the invention is particularly pointed out and distinctly claimed in the concluding portion of the specification. The invention, however, together with further objects and advantages thereof, may

BRIEF DESCRIPTION OF THE DETAILED DRAWINGS

DETAILED DESCRIPTION OF THE PREFERRED EMBODIMENTS

Figure 1:
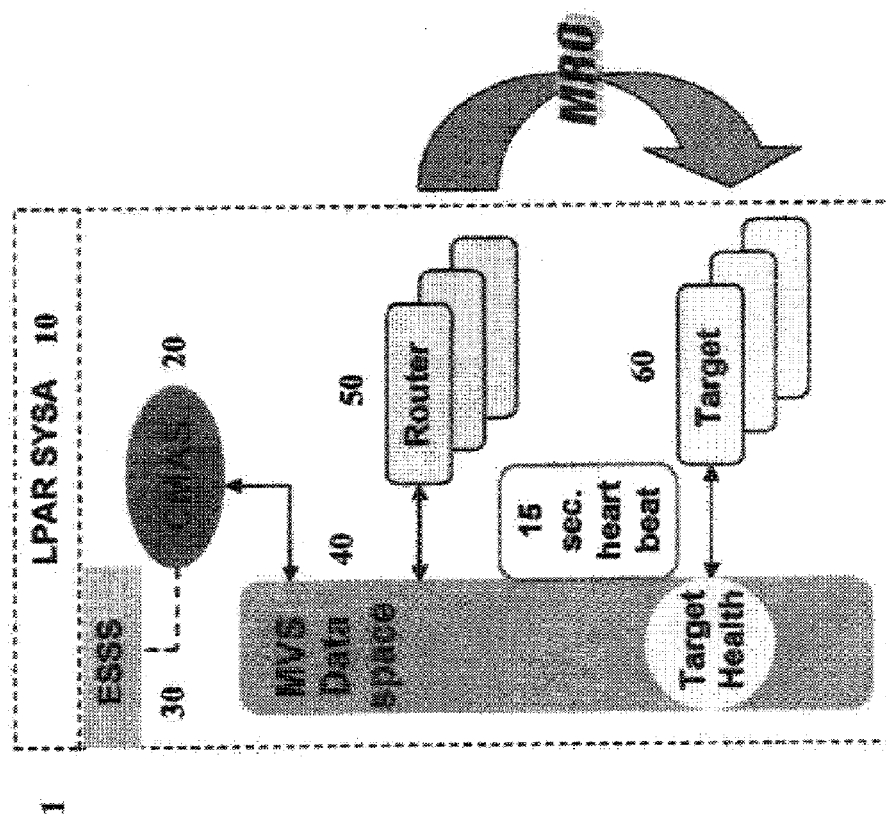
FIGS. 1 & 2 illustrate diagrams outlining operation of a customer information control system (CICS) "sysplex" in performance of workload management computer processing tasks according to the prior art.

As shown in FIG. 1, a current embodiment of the CICSplex workload management (WLM) system 1 consists of the following elements: (a) the system is divided into multiple communicating MVS logical partitions (LPARs) 10 which may span a sysplex 1; (b) operation of a CMAS (CICSplex System Address Space Manager) 20 is initiated to manage the processing activity taking place within each LPAR; (c) the CMAS in turn initiates use of the ESSS (Environment Services System Services) address space 30 to access the computer hardware/software processing resources for that LPAR; (d) the ESSS accesses multiple MVS dataspace(s) 40 including one (or more) which manages workload distribution for the LPAR; and (e) the CMAS 20 connects to the ESSS 30 in order to communicate with CMASs of other LPARs 10 using the information contained in the workload management (WLM) dataspace(s) 40.

As shown in FIG. 1, "routers" 50 and "targets" 60 typically connect to CICSplex (and to each other) in the following manner: (a) multiple routing regions 50 initialize and connect to the CICSplex 1 using the ESSS workload management dataspace(s) 40 to receive incoming processing work request(s) to be distributed (or "routed") to target process(ors) 60; (b) multiple "cloned" targets 60 then initialize and connect to the CICSplex WLM dataspace(s) 40 to obtain and execute processing task(s) distributed by the routers 50; and (c) routing region(s) 50 then establish multiple region operation (MRO) "private cross-memory connections" to target region(s) 60 in order to route incoming workload processing request(s) to the target(s).

Figure 2:
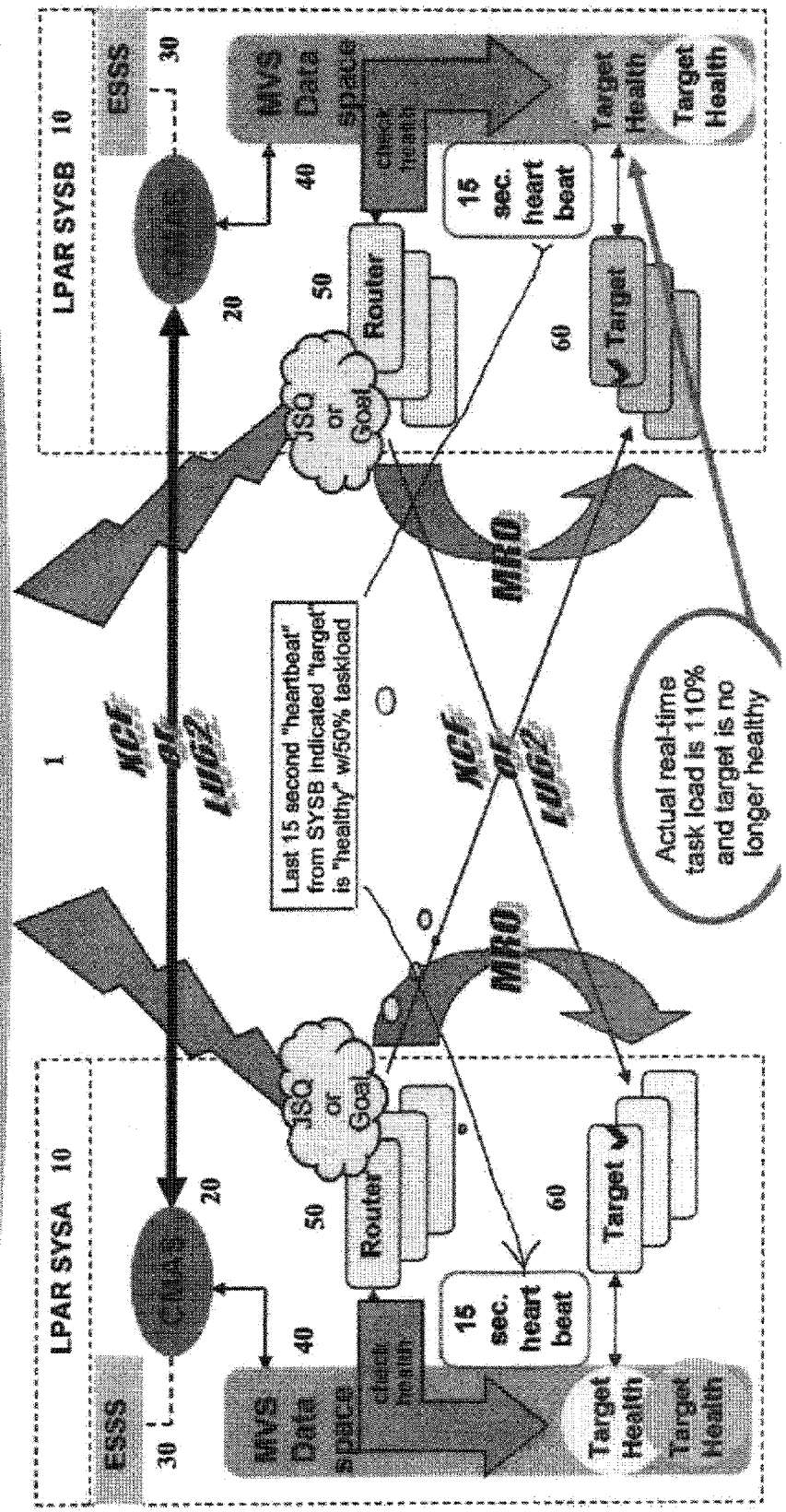

As shown in FIGS. 1 & 2, current CICS systems 1 balance workload on an internet protocol (TCP/IP) and/or virtual telecommunications access method (VTAM) network in the following manner: (a) each target 60 reports its current "processing health" in a fifteen (15) second "heartbeat" time interval to a control structure located in the WLM dataspace(s) 40; (b) incoming processing requests arriving over the network are workload balanced by the LPAR router(s) 50 using a VTAM Generic Resources and/or Sysplex Distributor program; (c) a router 50 queries (or "interrogates") a target 60 to select the "healthiest" one (i.e., most unoccupied/least loaded) for routing an incoming processing work request; and (d) a router 50 can use either a JSQ (Join Shortest Queue) or MVS Goal-Mode (or similar) workload management algorithm to route a work request to a target 60 (where both algorithms prefer to select local/same LPAR targets until a 65% load threshold for a target is reached).

As shown in FIG. 2, CMAS-to-CMAS connection(s) are established to share target health information across LPARs (i.e., SYSA & SYSB) when multiple LPARs are operating together as cloned "images" of each other in managing CICS workload. However in the example shown in FIG. 2, the most recent fifteen (15) second "heartbeat" status update (reported to SYSA) of the health of a target (located in SYSB) no longer reflects the actual (current) task load for that target, since in that case SYSA router(s) have used outdated (or "stale") information to distribute workload request(s) to an overloaded SYSB target process(or) resulting in a surging effect known as "target sickness" (as described above).

Figure 3:
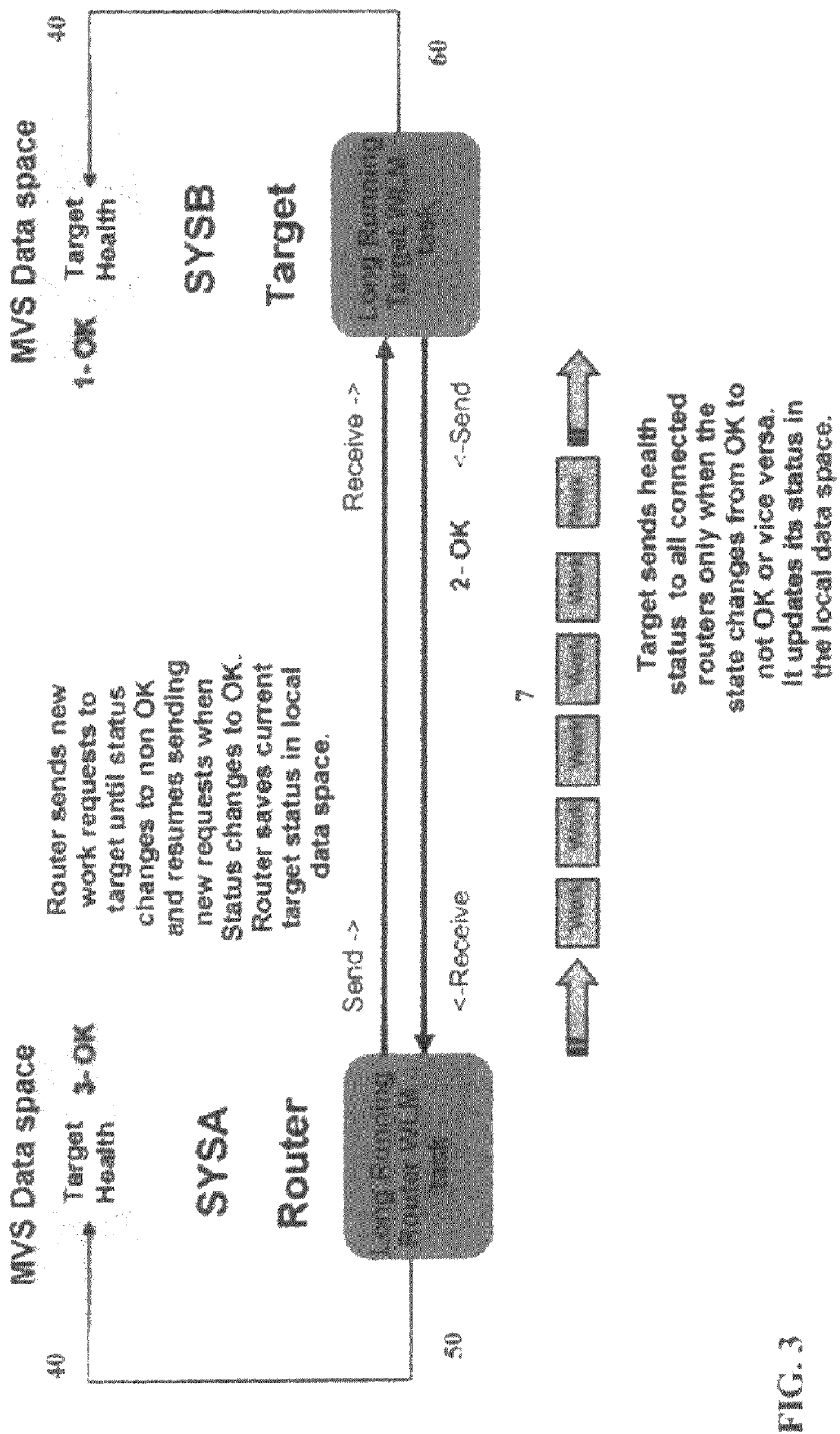
FIGS. 3 & 4 illustrate diagrams outlining operation of a customer information control system (CICS) "sysplex" in performance of workload management computer processing tasks according to the invention.
Figure 4:
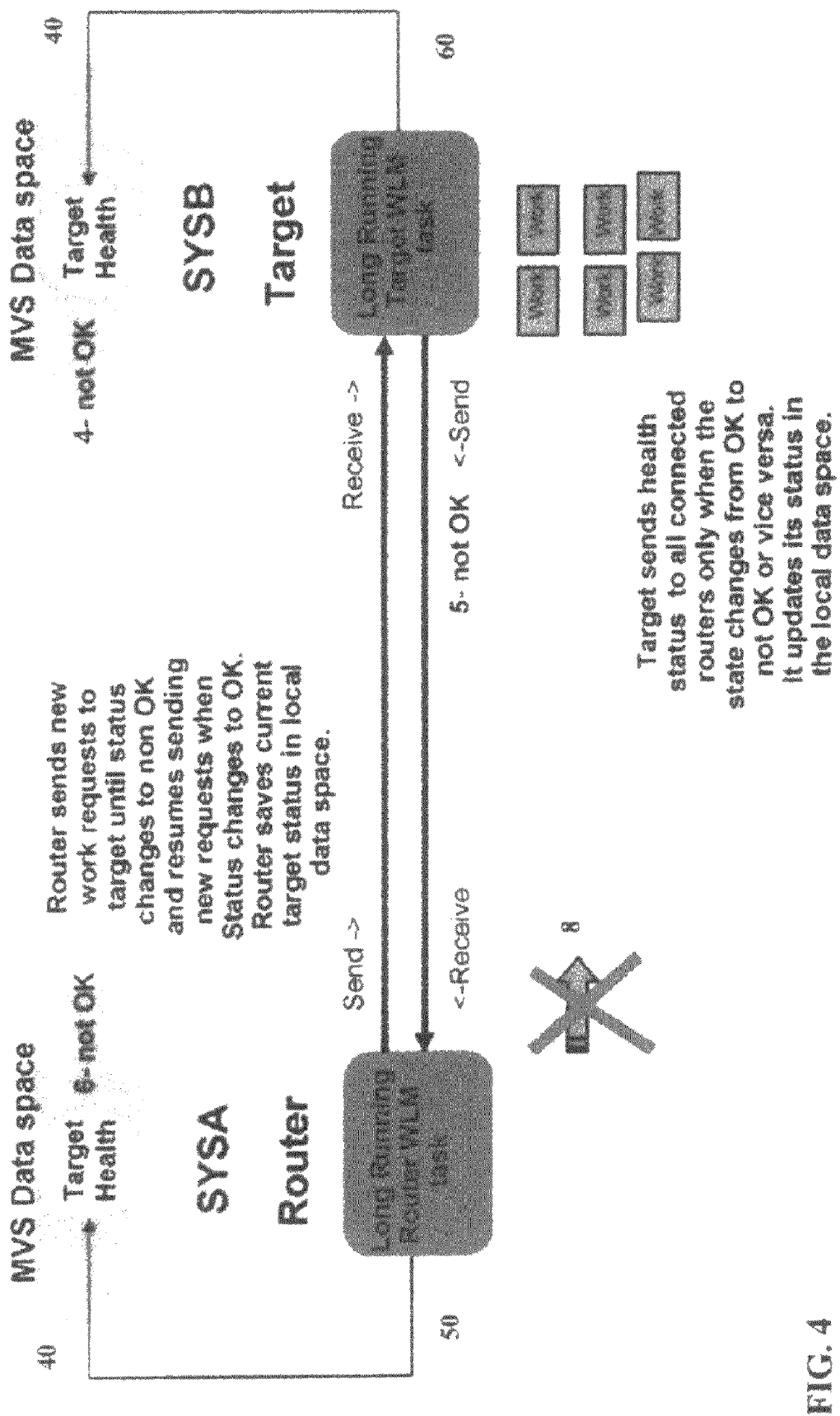

To solve this problem, a preferred embodiment of the invention as illustrated in FIGS. 3 & 4 provides as follows: (i) each target region 60 maintains a structure in its WLM dataspace(s) 40 containing the current (up-to-date) processing health status of that target region; (ii) an LPAR routing region 50 initiates a "long running" WLM processing task that allocates a "send" and "receive" session to send workload requests to (and receive target health status information from) a target region 60 identified in its own and/or another connected LPAR 10; (iii) each target region 60 locally updates its own health status information at the termination of every processing transaction ("1-OK" in FIG. 3 or "4-not OK" in FIG. 4); (iv) each target 60 compares its current health calculation with its most recent previous health calculation; (v) if the target region health has changed (e.g., from "1-OK" in FIGS. 3 to "4-not OK" in FIG. 4 or vice versa) since its last calculation then the updated target health status is automatically transmitted to a router 50 by that target 60 using the allocated "send" and "receive" session (i.e., the target sends an updated health status to connected routers only when the state changes from "green light"/"OK"/available to "red light"/"not OK"/unavailable ("5-not OK" in FIG. 4) or vice versa ("2-OK" in FIG. 3)); (vi) the long-running WLM task(s) initiated by a routing region 50 are used to immediately receive updated health status information from an available (connected) target region 60 to allow updating of the router WLM dataspace structure 40 ("3-OK" in FIG. 3 or "6-not OK" in FIG. 4) (where for example "compare-and-swap" logic is used to update a data table in the router WLM dataspace in "sort order" based on the updated calculated health of the identified target); (vii) a long-running WLM task in the routing region(s) 50 distributes work to one or more available target region(s) 60 based on current health status (i.e., a router sends new work requests to a target until its status changes from "green light"/"OK"/available to "red light"/"not OK"/unavailable ("1-OK"/"3-OK" in FIGS. 3 to "4-OK"/"6-not OK" in FIG. 4) and then resumes sending new requests when the status reverts back to "green light"/"OK"/available ("4-OK"/"6-not OK" in FIGS. 4 to "1-OK"/"3-OK" in FIG. 3) preferably using the JSQ and/or "Goal-Mode" algorithm(s) (as described above) Multiple long-running processing tasks can be initiated within a router based on user-specified thresholds for arriving work requests.

While certain preferred features of the invention have been shown by way of illustration, many modifications and changes can be made that fall within the true spirit of the invention as embodied in the following claims, which are to be interpreted as broadly as the law permits to cover the full scope of the invention, including all equivalents thereto.

What is claimed is:

1. A computer-readable storage medium comprising computer-readable instructions stored thereon which, when executed by a processor, perform a method to prevent a surging of processing transactions to an unhealthy target region in a distributed transaction processing system, the distributed transaction processing system comprising an operating system divided into a plurality of logical partitions (LPARs), each LPAR comprising an operating system data space, a plurality of routing regions, and a plurality of target regions, wherein each target region has a current processing health and each routing region is connected to two or more of the plurality of target regions at least one of which is in a different LPAR than the corresponding connected routing region, wherein each LPAR maintains control structures in the data space of the LPAR each associated with a respective routing region of the LPAR, each of the control structures being updated with processing health information of target regions connected to the associated routing region by a heartbeat issued at a fixed time interval, wherein each routing region transmits processing transactions to the connected target regions based on the processing health information stored in the control structure which may be outdated relative to the current processing health of the connected target regions resulting in the surging of processing transactions to the unhealthy target region, the method to prevent the surging comprising:

where the heartbeat updates are terminated; and separating each of the control structures on each LPAR into a set of separate control structures, each separate control structure storing health status information for a respective one of the target regions connected to at least one of the routing regions of the LPAR, the respective target regions being of one or more different LPARs than the LPAR maintaining the set of separate control structures;

maintaining for each of the target regions a local health status structure with health status information of the corresponding target region, the local health status structure being maintained within the operating system data space of the LPAR comprising the corresponding target region; and in response to completion of each processing transaction by one of the target regions, the one target region:

updating previous health status information within the local health status structure corresponding to the one target region with current health status information of the one target region;

comparing the current health status information with the previous health status information;

determining whether a health status change between the current health status information and the previous health status information has occurred and whether additional processing transactions may now or no longer be processed as a result of the health status change;

transmitting, in response to determining that the health status change has occurred and that the additional processing transactions may now or no longer be processed as the result of the health status change, current health status reflecting the health status change to each of a plurality of connected remote routing regions, wherein the remote routing regions operate within one or more LPARs different than the LPAR comprising the one target region; and the transmitted current health status is receivable at each of the connected remote routing regions, wherein each receiving routing region either resumes or ceases transmission of processing transactions to the one target region in response to receiving the current health status dependent upon if the one target region may now or no longer process additional transactions as the result of the health status change and further updates the health status information stored in the separate control structure corresponding to the one target region maintained in the data space of the LPAR comprising the receiving routing region with the current health status.

2. The computer-readable storage medium of claim 1, where each of the plurality of routing regions that operate within the same LPAR establishes a private connection to each connected target region used to execute processing requests.

3. The computer-readable storage medium of claim 1 where, transmitting, in response to determining that the health status change has occurred and that the additional processing transactions may now be processed as the result of the health status change, the current health status reflecting the health status change to each of the plurality of connected remote routing regions, where the remote routing regions operate within the one or more LPARs different than the LPAR comprising the one target region comprises communicating an available status to each of the plurality of connected routing regions.

4. The computer-readable storage medium of claim 1, further comprising communicating, in response to completion of each processing transaction and in response to determining that the health status change has occurred and that the additional processing tasks may no longer be processed as the result of the health status change, an unavailable status to each of the plurality of connected routing regions to cease distribution of processing requests.

5. The computer-readable storage medium of claim 1, further comprising receiving at least one processing transaction from at least one of the plurality of connected routing regions in response to transmitting the current health status to each of the plurality of connected routing regions that operate within the same LPAR, and in response to the at least one of the plurality of connected routing regions using one of a Join Shortest Queue algorithm and a Goal-Mode algorithm to distribute the at least one processing transaction.

6. The computer-readable storage medium of claim 1, where the at least one target region comprises at least two target processors configured as cloned target processors and, in operating to process distributed processing transactions within the operating system data space the cloned target processors process the distributed processing transactions from at least one address space manager for two or more of the LPARs to perform workload management for a sysplex.

7. The computer-readable storage medium of claim 6, where the sysplex is used to operate the distributed transaction processing system over an internet protocol or virtual telecommunications access method network.

8. A method to prevent a surging of processing transactions to an unhealthy target region in a distributed transaction processing system, the distributed transaction processing system comprising an operating system divided into a plurality of logical partitions (LPARs), each LPAR comprising an operating system data space, a plurality of routing regions, and a plurality of target regions, wherein each target region has a current processing health and each routing region is connected to two or more of the plurality of target regions at least one of which is in a different LPAR than the corresponding connected routing region, wherein each LPAR maintains control structures in the data space of the LPAR each associated with a respective routing region of the LPAR, each of the control structures being updated with processing health information of target regions connected to the associated routing region by a heartbeat issued at a fixed time interval, wherein each routing region transmits processing transactions to the connected target regions based on the processing health information stored in the control structure which may be outdated relative to the current processing health of the connected target regions resulting in the surging of processing transactions to the unhealthy target region, the method to prevent the surging, comprising:

where the heartbeat updates are terminated; and separating each of the control structures on each LPAR into a set of separate control structures, each separate control structure storing health status information for a respective one of the target regions connected to at least one of the routing regions of the LPAR, the respective target regions being of one or more different LPARs than the LPAR maintaining the set of separate control structures;

maintaining for each of the target regions a local health status structure with health status information of the corresponding target region, the local health status structure being maintained within the operating system data space of the LPAR comprising the corresponding target region; and in response to completion of each processing transaction by one of the target regions, the one target region:

updating previous health status information within the local health status structure corresponding to the one target region with current health status information of the one target region;

comparing the current health status information with the previous health status information;

determining whether a health status change between the current health status information and the previous health status information has occurred and whether additional processing transactions may now or no longer be processed as a result of the health status change;

transmitting, in response to determining that the health status change has occurred and that the additional processing transactions may now or no longer be processed as the result of the health status change, current health status reflecting the health status change to each of a plurality of connected remote routing regions, wherein the remote routing regions operate within one or more LPARs different than the LPAR comprising the one target region the transmitted current health status being receivable at each of the connected remote routing regions, wherein each receiving routing region either resumes or ceases transmission of processing transactions to the one target region in response to receiving the current health status dependent upon if the one target region may now or no longer process additional transactions as the result of the health status change and further updates the health status information stored in the separate control structure corresponding to the one target region maintained in the data space of the LPAR comprising the receiving routing region with the current health status.

9. The method of claim 8, where each of the plurality of routing regions that operate within the same LPAR establishes a private connection to each connected target region used to execute processing requests.

10. The method of claim 8 where, transmitting, in response to determining that the health status change has occurred and that the additional processing transactions may now be processed as the result of the health status change, the current health status reflecting the health status change to each of the plurality of connected remote routing regions, where the remote routing regions operate within the one or more LPARs different than the LPAR comprising the one target region comprises communicating an available status to each of the plurality of connected routing regions.

11. The method of claim 8, further comprising communicating, in response to completion of each processing transaction and in response to determining that the health status change has occurred and that the additional processing tasks may no longer be processed as the result of the health status change, an unavailable status to each of the plurality of connected routing regions to cease distribution of processing requests.

12. The method of claim 8, further comprising receiving at least one processing transaction from at least one of the plurality of connected routing regions in response to transmitting the current health status to each of the plurality of connected routing regions that operate within the same LPAR and in response to the at least one of the plurality of connected routing regions using one of a Join Shortest Queue algorithm and a Goal-Mode algorithm to distribute the at least one processing transaction.

13. The method of claim 8, where the at least one target region comprises at least two target processors configured as cloned target processors and, in operating to process distributed processing transactions within the operating system data space, the cloned target processors process the distributed processing transactions from at least one address space manager for two or more of the LPARs to perform workload management for a sysplex.

14. The method of claim 13 where the sysplex is used to operate the distributed transaction processing system over an internet protocol or virtual telecommunications access method network.

* * * * *